United States Patent [19]

Walker et al.

[11] 4,051,585
[45] Oct. 4, 1977

[54] METHOD OF FORMING A TURBINE ROTOR

[75] Inventors: Bryant H. Walker, Stuart; William D. Carruthers, West Palm Beach; Donald G. MacNitt, Jr., Riviera Beach, all of Fla.

[73] Assignee: United Technologies Corporation, Hartford, Conn.

[21] Appl. No.: 708,672

[22] Filed: July 26, 1976

[51] Int. Cl.² .............................................. B23P 15/04
[52] U.S. Cl. ................................ 29/156.8 R; 228/193; 416/241 B; 416/213 R; 416/244 A
[58] Field of Search ............... 29/156.8 R; 416/241 B, 416/214 A, 213, 244 A; 228/193

[56] References Cited

U.S. PATENT DOCUMENTS

| | | | |
|---|---|---|---|
| 2,494,658 | 1/1950 | Highberg et al. | 29/156.8 R |
| 2,730,794 | 1/1956 | Schörner | 416/214 A |
| 3,047,936 | 8/1962 | Knowles | 29/156.8 CF |
| 3,055,633 | 9/1962 | Pouit | 416/214 A |
| 3,429,700 | 2/1969 | Wiegand et al. | 416/213 |
| 3,519,503 | 7/1970 | Moore et al. | 148/11.5 |
| 3,574,924 | 4/1971 | Dibble | 416/213 |
| 3,787,959 | 1/1974 | Moore et al. | 228/193 |

FOREIGN PATENT DOCUMENTS

| | | | |
|---|---|---|---|
| 447,111 | 3/1948 | Canada | 416/214 |
| 892,785 | 5/1944 | France | 416/241 B |
| 735,184 | 5/1943 | Germany | 416/214 A |
| 829,970 | 1/1952 | Germany | 416/241 B |
| 220,294 | 3/1942 | Switzerland | 416/241 B |
| 753,229 | 7/1956 | United Kingdom | 416/241 B |

Primary Examiner—C.W. Lanham
Assistant Examiner—Daniel C. Crane
Attorney, Agent, or Firm—Jack N. McCarthy

[57] ABSTRACT

A rotor for a gas turbine engine has a wrought superalloy disk with ceramic blades. The rotor is formed by placing ceramic blades in a fixture with their ceramic blade roots extending inwardly and between the upper and lower rims of a disk or disk halves. The facing upper and lower circumferential rims are cut away to provide for the ceramic blade roots. Said disk or disk halves being of a wrought superalloy having a fine grain size microstructure which can be placed in a superplastic condition. A compliant layer material is placed between the ceramic blade roots and the rims of the disk, and the disk and compliant layer are then heated so as to place the disk in a superplastic condition and pressed into intimate contact with the ceramic blade root, and if disk halves are being used, they are bonded together at inner mating surfaces. The rotor is then heat treated to return the disk to its normal condition of high strength and hardness. The compliant layer can be a thin layer of material inserted between the blade root and disk, or it can be a material applied directly to the blade root or disk slot such as by plating, sputtering, or flame spraying.

4 Claims, 4 Drawing Figures

U.S. Patent   Oct. 4, 1977   4,051,585
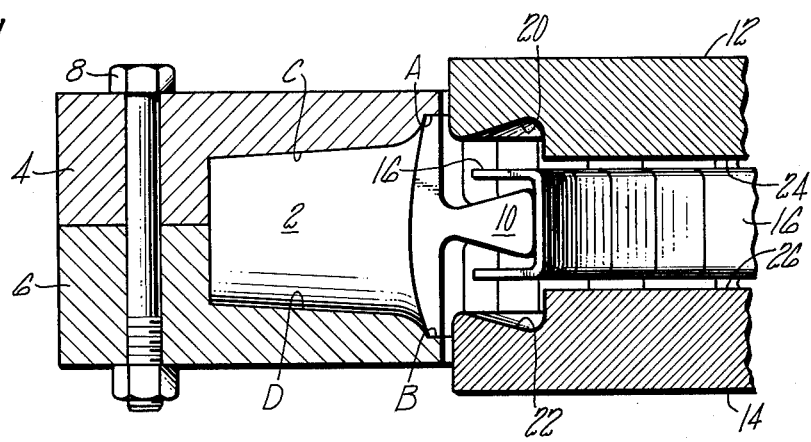
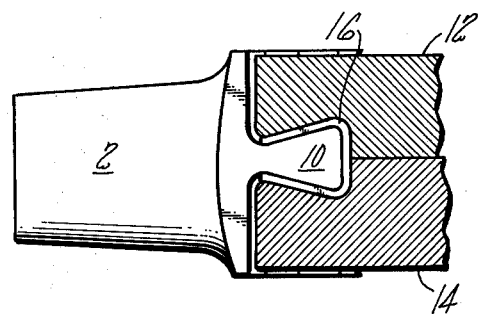
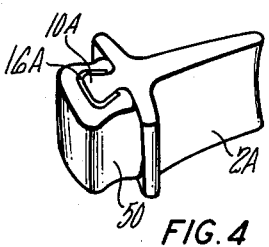
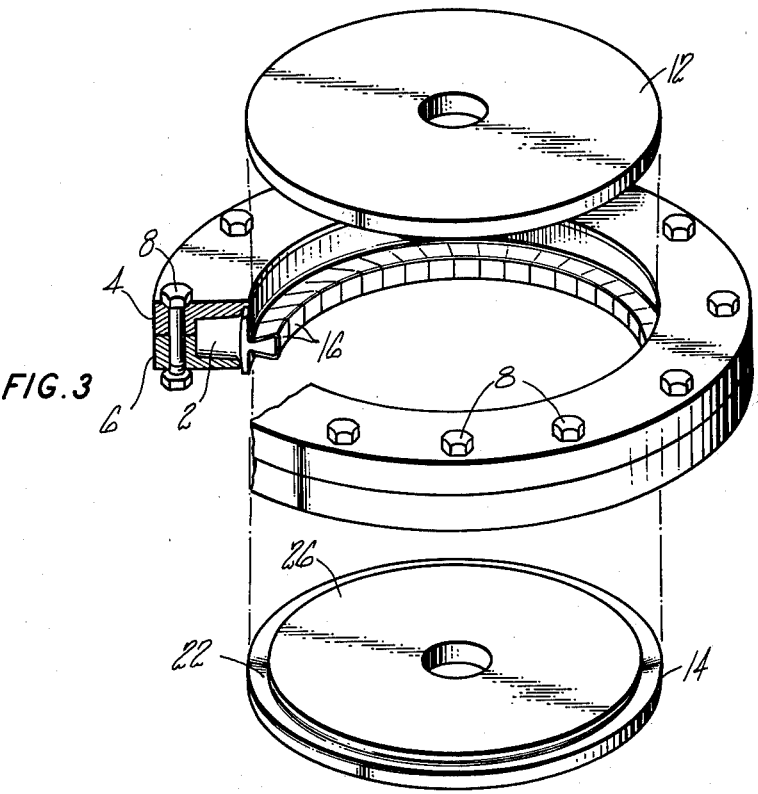

METHOD OF FORMING A TURBINE ROTOR

The invention herein described was made in the course of or under a contract or subcontract with the Department of the Navy.

BACKGROUND OF THE INVENTION

The present invention relates to a method for attaching preformed ceramic blades to a wrought superalloy disk. In the gas turbine engine industry, to which the present invention has particular application, gas turbine rotors are generally made having metallic blades. U.S. Pat. No. 3,047,936 shows a method of attaching blades to a rotor disk.

SUMMARY OF THE INVENTION

It is an object of the present invention to provide a means of attaching ceramic turbine blades to a wrought superalloy turbine disk.

A further object of this invention is to provide a method for manufacturing turbine rotors having ceramic blades.

It is another object of this invention to provide a compliant layer between the roots of the ceramic blades and the wrought superalloy disk. The use of this compliant layer will enhance the uniform stress distribution in the ceramic blade root as well as prevent any detrimental reaction between the ceramic and superalloy materials.

BRIEF DESCRIPTION OF THE DRAWINGS

FIG. 1 is a fragmentary sectional view showing ceramic blades held in place by a fixture with a compliant layer positioned between the ceramic blade roots and rims of two wrought superalloy disk halves.

FIG. 2 is a fragmentary figure showing a ceramic blade assembled on a wrought superalloy rotor disk.

FIG. 3 is a perspective view showing blades positioned by a fixture with disk halves in position to be placed in surface contact at their rims against the compliant layers and in turn pressed against the ceramic blade roots and diffusion bonded in the center to each other.

FIG. 4 is a perspective view showing one ceramic blade having a wrought superalloy root attached thereto with a compliant layer therebetween.

DESCRIPTION OF THE PREFERRED EMBODIMENT

FIG. 1 shows a ceramic blade 2 held between clamping members 4 and 6. The holding members 4 and 6 are annular and are clamped together by a plurality of bolts 8. Similar holding means is set forth in U.S. Pat. No. 3,047,936. The inner circumference of the holding members 4 and 6 are recessed at A and B to receive the platform of the blades and are recessed at C and D in a cooperative manner to receive the ceramic blade, other holding means can be used if desired. Blade roots 10 project inwardly towards a center and form an annular flange. Each blade root 10 is formed of a simple geometry wherein it tapers outwardly towards an enlarged free end so it can be encapsulated.

Two disk halves 12 and 14, each formed from a wrought superalloy, having a fine grain size microstructure which can exhibit superplasticity, are shown positioned on each side of the blade roots 10 before they are placed in a superplastic condition and pressed in that condition into position as shown in FIG. 2 to surround and lock them in position. U.S. Pat. No. 3,519,503 sets forth a method of placing superalloys in a temporary condition of low strength and high ductility, such as necessary for this step, and then returning them to their normal condition of high strength and hardness by heat treatment. U.S. Pat. No. 3,698,219 sets forth apparatus which can be used to perform the necessary heating and pressing steps. A compliant layer 16 is positioned with respect to the blade roots 10 so that when the disk halves 12 and 14 are pressed toward each other, the compliant layer 16 will occupy the space between the rims of the disk halves and the plurality of blade roots 10. Superplasticity, which is manifested by a low flow stress and high ductility, is essential to this invention since, under superplastic conditions the stresses required to deform the disk are low enough to avoid damage to the ceramic blade roots.

Each disk half 12 and 14 is formed having a circumferential contoured groove 20 and 22 placed therein, respectively to accommodate the geometry of the ceramic blade roots 10 and compliant layer 16 so that a uniform surface-to-surface contact is obtained without ceramic fracture and the proper amount of compressive preload is placed on the ceramic blade root.

The compliant layer 16 will transfer the compressive load of the superalloy uniformly to the ceramic without creating point loading. The compliant layer 16 must also be capable of withstanding the high temperatures that it will be exposed to during fabrication of the turbine rotor, during the heat treatments thereafter, and during its use in operation, which can be 1800° F. in an engine application. The compliant layer should also be of a nonreactant material producing no detrimental reactions to either the ceramic blade root or the superalloy disk. Further, if possible the compliant layer should have a low thermal conductivity to aid in maintaining the superalloy disk in its operable temperature range while the ceramic blade is at a high temperature, such as 2500° F.

This structure permits the surfaces 24 and 26, respectively, of the disk halves 12 and 14 located inwardly from the circumferential contoured grooves 20 and 22 to be used for forming a diffusion bond. The grooves 20 and 22 are sized in relation to the compliant layer 16 so that the mating surfaces 24 and 26 of the disk halves 12 and 14 provide enough upset against each other to assure a complete diffusion bond during the forming of the turbine rotor. It is to be remembered that the surfaces of the disk halves 12 and 14 which will be diffusion bonded must be maintained in a clean condition for proper bonding. Diffusion bonding as a manufacturing process is well known as evidenced, for example, by the U.S. Pat. No. 3,327,382 to keeleric. Diffusion bonding is also discussed on pages 28 to 32 of "Adhesives Age", July 1970.

After the turbine rotor has been formed, it is heat treated to return it to its normal condition of high strength and hardness.

A major benefit of this invention is that the ceramic blade roots are maintained in a state of residual compression. The coefficient of thermal expansion of superalloys exceeds the coefficient of expansion of ceramics, consequently after the superplastic deformation/bonding step the metal will contract relative to the ceramic maintaining it in a compressive state. In normal subsequent operation the disk temperature will be below that used in the forming step, and a compressive state will be maintained. It is well known that the compressive properties of ceramics greatly exceeds the tensile properties of ceramics.

While each disk half 12 and 14 is shown formed having a circumferential contoured groove 20 and 22 placed therein, if the spacing of the blades is to be greater than that shown, separate pockets can be formed around the circumference, one for each blade root to accommodate the geometry of the ceramic blade root 10 and compliant layer 16 of that root. The rotor parts can then be treated the same as before, that is the rotor can be placed in a superplastic condition and pressed in that condition to surround and lock the blades in position. Further, while the compliant layer has been shown as a separate member, a material may be applied directly to the blade root 10 or groove 20 and 22 by plating, sputtering, or flame spraying.

In an evaluation of the method set forth, the superalloy used for the disk was AF2-1DA, the ceramic used was $Si_3N_4$, and a compliant layer was made of platinum. The nominal composition of AF2-1DA is 0.35%C, 12%Cr, 10%Co, 3%Mo, 6%W, 3%Ti, 4.6%Al, 0.15%B, 0.1%Zr, 1.5%Ta, Balance Ni.

FIG. 4 shows an individual ceramic blade 2A having a blade root 10A with a root member 50 formed thereon from a wrought superalloy. This blade 2A would be used in a conventional manner in a disk having slots therein to receive the root member 50. A compliant layer 16A is positioned between the superalloy root 50 and the ceramic root 10A. This root is applied in the same manner as the disk halves in the embodiment shown in FIGS. 1, 2 and 3. The blade 2A is held by a fixture while the superalloy root 50 is placed in a superplastic condition and pressed onto the ceramic root 10A in that condition with care being taken to prevent ceramic fracture while placing the proper amount of compressive preload on the ceramic blade root. While a dovetail shaped root is shown in FIG. 4, a fir-tree root would generally be used.

We claim:
1. Method of forming a turbine rotor having a superalloy disk with ceramic blades, including the steps of:
    1. forming ceramic blade members having a root section with an enlargement thereon,
    2. holding said ceramic blades together with the root sections projecting radially inward,
    3. placing a compliant layer around said root sections,
    4. forming two disk halves of a wrought superalloy having a fine grain size microstructure which can be placed in a superplastic condition,
    5. contouring the outer circumference of each disk half to accommodate the ceramic blade root and compliant layer,
    6. aligning said disk halves so that the contoured circumferences will contact the compliant layer,
    7. placing said disk halves in a superplastic condition,
    8. pressing said disk halves together while they are in said superplastic condition to place the contoured circumference, compliant layer and blade roots in surface-to-surface contact placing the blade roots in compression.
2. A method as set forth in claim 1 including the following step (9) heat treating said disk halves to return them to their normal condition of high strength and hardness.
3. A method as set forth in claim 1 wherein step (8) said disk halves are diffusion bonded at a meeting surface located inwardly of the outer circumference.
4. A method as set forth in claim 1 wherein step (7) the disk halves are heated to a temperature which is greater than the temperature of the environment of their intended use.

* * * * *